(12) United States Patent
Chauhan et al.

(10) Patent No.: US 9,990,637 B2
(45) Date of Patent: Jun. 5, 2018

(54) RETAIL REINVENTION AND SELF HELP CARE PORTAL

(71) Applicant: T-Mobile USA, Inc., Bellevue, WA (US)

(72) Inventors: Kanakrai Gajendra Chauhan, Bellevue, WA (US); Omar Hassan, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 675 days.

(21) Appl. No.: 14/555,447

(22) Filed: Nov. 26, 2014

(65) Prior Publication Data

US 2015/0186895 A1 Jul. 2, 2015

Related U.S. Application Data

(60) Provisional application No. 61/921,215, filed on Dec. 27, 2013.

(51) Int. Cl.
*G06Q 30/00* (2012.01)
*G06Q 30/02* (2012.01)
(Continued)

(52) U.S. Cl.
CPC ......... *G06Q 30/016* (2013.01); *G06Q 30/012* (2013.01); *G06Q 30/0281* (2013.01);
(Continued)

(58) Field of Classification Search
CPC .................. G06Q 30/016; G06Q 30/0281
See application file for complete search history.

(56) References Cited

U.S. PATENT DOCUMENTS 6,317,777 B1 11/2001 Skarbo et al.
7,128,270 B2 * 10/2006 Silverbrook ........ G06F 3/03545
235/472.01
(Continued)

FOREIGN PATENT DOCUMENTS

WO WO2007010541 1/2007
WO WO2013184347 12/2013

OTHER PUBLICATIONS

The PCT Search Report and Written Opinion dated Mar. 26, 2015 for PCT application No. PCT/US2014/071133.
(Continued)

*Primary Examiner* — Khanh Dinh
(74) *Attorney, Agent, or Firm* — Lee & Hayes, PLLC

(57) ABSTRACT

A system and method for implementing an in-store kiosk device as part of a retail reinvention and self help care portal. The in-store kiosk device may allow a consumer to self-diagnose problems with electronic devices, such as smart phones, and to seek technical or service related assistance with appropriate experts. The in-store kiosk device may also facilitate initiating a communication between the consumer and multiple experts, to help resolve any consumer technical or sales queries. In some examples, the in-store kiosk device has the added advantage of providing consumers with a means to have service or inventory-related issues addressed without having to wait for available in-store service staff. The in-store kiosk device may also facilitate electronic device exchange.

18 Claims, 8 Drawing Sheets

(51) Int. Cl.
  *H04L 29/06* (2006.01)
  *H04L 29/08* (2006.01)
(52) U.S. Cl.
  CPC .......... *H04L 29/06* (2013.01); *H04L 63/0861* (2013.01); *H04L 65/403* (2013.01); *H04L 65/607* (2013.01); *H04L 67/22* (2013.01); *H04L 29/08072* (2013.01); *H04L 63/08* (2013.01)

(56) References Cited

U.S. PATENT DOCUMENTS

| | | | |
|---|---|---|---|
| 7,630,986 B1* | 12/2009 | Herz | G06Q 10/10 |
| 7,877,460 B1 | 1/2011 | Brouwer et al. | |
| 8,473,743 B2 | 6/2013 | Freedman et al. | |
| 8,923,125 B2* | 12/2014 | Lott | H04L 47/10 370/235 |
| 9,452,884 B2* | 9/2016 | Rutledge | G07C 9/00134 |
| 9,569,587 B2* | 2/2017 | Ansari | G06F 19/322 |
| 2001/0047270 A1* | 11/2001 | Gusick | G06Q 30/016 705/1.1 |
| 2002/0042820 A1 | 4/2002 | Strom | |
| 2002/0136206 A1 | 9/2002 | Gallant et al. | |
| 2003/0061493 A1 | 3/2003 | Angelo et al. | |
| 2003/0065626 A1 | 4/2003 | Allen | |
| 2005/0049897 A1 | 3/2005 | Kameda | |
| 2006/0210041 A1 | 9/2006 | Citron et al. | |
| 2007/0077966 A1 | 4/2007 | Huang | |
| 2009/0164639 A1 | 6/2009 | Sylvain | |
| 2010/0165845 A1* | 7/2010 | Lott | H04L 47/10 370/235 |
| 2011/0119490 A1 | 5/2011 | Kaal et al. | |
| 2011/0231495 A1 | 9/2011 | Westen et al. | |
| 2013/0089187 A1 | 4/2013 | Stahl | |
| 2013/0244614 A1 | 9/2013 | Santamaria et al. | |
| 2013/0332607 A1 | 12/2013 | Santamaria et al. | |
| 2014/0108025 A1 | 4/2014 | Echeverria Cabrera et al. | |
| 2014/0149505 A1 | 5/2014 | Christiansen | |
| 2014/0219167 A1 | 8/2014 | Santhanam et al. | |
| 2014/0223453 A1 | 8/2014 | Li | |
| 2014/0235199 A1 | 8/2014 | Wong | |
| 2015/0188843 A1 | 7/2015 | Chauhan et al. | |
| 2015/0188956 A1 | 7/2015 | Chauhan et al. | |
| 2016/0022218 A1* | 1/2016 | Hayes | A61G 7/005 600/301 |

OTHER PUBLICATIONS

ShoreTel Inc., "ShoreTel Sky Mobility", Dec. 31, 2012, retrieved from http://www.alturacs.com/wordp/wp-content/uploads/resources/Collateral%20-%20ShoreTEI%20Mobility.pdf, pp. 1-2.
Skype Technologies S.A., "Skype Guide for Network Administrators: Skype 3.0 Beta", Oct. 31, 2006, retrieved from http://webcache.googleusercontent.com/search?q=cache:LzieX28FfDEJ:www.oklabs.net//wp-content/uploads/2012/06/guide-for-network-admins-30beta.pdf+&cd=1&hk=ko&ct=clnk&gl=kr, p. 5, line 5-p. 27, line 10.
Visual Steps B.V., "Using Skype on your iPhone and/or iPad", Aug. 31, 2012, retrieved from http://www.visualsteps.com/assets/review/Guide-Using-Skype-on-your-iPhone-or-iPad.pdf, pp. 9-25 and 28-31.
Office action for U.S. Appl. No. 14/488,979, dated Mar. 3, 2016, Chauhan et al., "Unified Communication Device", 17 pages.
Office action for U.S. Appl. No. 14/574,001, dated Nov. 16, 2016, Westwater, "User Account-Based Access to Real-Time Communications", 15 pages.
Office action for U.S. Appl. No. 14/488,979, dated Sep. 8, 2016, Chauhan et al., "Unified Communication Device", 15 pages.
The Partial Supplementary European Search Report dated Jul. 11, 2017 for European Patent Application No. 14875734.7, 17 pages.
Office action for U.S. Appl. No. 14/574,001, dated May 25, 2017, Westwater, "User Account-Based Access to Real-Time Communications", 18 pages.

* cited by examiner

RETAIL REINVENTION AND SELF HELP CARE PORTAL

CROSS-REFERENCE TO RELATED APPLICATION

This application claims priority to U.S. Patent Application 61/921,215 filed on Dec. 27, 2013, entitled "WebRTC," which is herein incorporated by reference in its entirety.

BACKGROUND

Retail stores that sell electronic devices, such as smart phones, often struggle to provide consumers with adequate service assistance. Electronic devices are becoming more and more technical in nature and retail stores are finding it necessary to have access to service staff with a high-degree of knowledge or familiarity with the electronic devices on sale. Often, the sheer volume of requests for assistance, far exceed the number of in-store service staff available, leaving consumers frustrated at the lack of service support.

To address these issues, some retail stores have begun providing in-store assistance directories that allow consumers to self-help common issues without having to wait for an available in-store service staff. These directories may allow consumers to navigate through general information that targets common problems experienced with particular electronic devices. However, these directories generally have a limited scope of assistance and are often helpful only if a consumer is able to self-diagnose an issue and adequately navigate through the assistance directory to find relevant self-help information.

SUMMARY

This disclosure describes systems and methods for implementing an in-store kiosk device as part of a retail reinvention and self help care portal. The in-store kiosk allows a consumer to self-diagnose problems with electronic devices, such as smart phones, and to seek technical or service related assistance with appropriate experts. In some examples, the in-store kiosk device has the added advantage of providing consumers with a means to have service or inventory-related issues addressed without having to wait for available in-store service staff.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

The disclosure describes herein an in-store kiosk device that allows consumers to self-diagnose problems associated with electronic devices, such as smart phones, and to seek technical or service-related assistance with appropriate experts. In some examples, the in-store kiosk device has the added advantage of providing consumers with a means to have service or inventory-related issues addressed without having to wait for available in-store service staff. In at least one example, the in-store kiosk may include features such as Bill Pay, Account Management, Device diagnostics, device returns, consumer specific coverage maps and an ability to connect with an appropriate expert via voice or voice/video at any stage. In other examples, the in-store kiosk device may provide consumers with retail assistance. The in-store kiosk may be integrated with a retailer's online content catalog and sales team, allowing a consumer to search through a retailer's sales inventory and direct inventory-related questions to an appropriate sales team.

In at least some examples, an in-store kiosk device may communicate expert information to a consumer by displaying a relevant document through an integrated display. In other examples the in-store kiosk device, may be equipped with video-audio functionality, allowing consumers to communicate directly with an appropriate expert. The video-audio functionality can facilitate multiple experts or agencies conferencing with the consumer.

The in-store kiosk device may include functionality that identifies appropriate experts based on a context of interactions between the consumer and the in-store kiosk device. For example, if a consumer is seeking assistance with a billing discrepancy, the in-store kiosk device may identify the context of the interactions as related to "Account Management" and then connect the consumer to an Account Management Expert. The in-store kiosk device may provide a prompt requesting the consumer to confirm a selection of an appropriate expert. In some examples, if an appropriate expert has been erroneously identified, the consumer may provide a selection that indicates the same, and select an appropriate expert from an available index listing.

In at least some examples, the in-store kiosk device may allow consumers to manage features associated with an electronics device. For example, if a consumer is having a problem with a smart phone, an in-store kiosk device may be equipped with input devices capable of connecting to the smart phone and performing a diagnostic analysis to help resolve the issue. The consumer may then be presented with a corrective option, one of which may be to contact an appropriate expert through the in-store kiosk device.

Illustrative Environments

Figure 1:
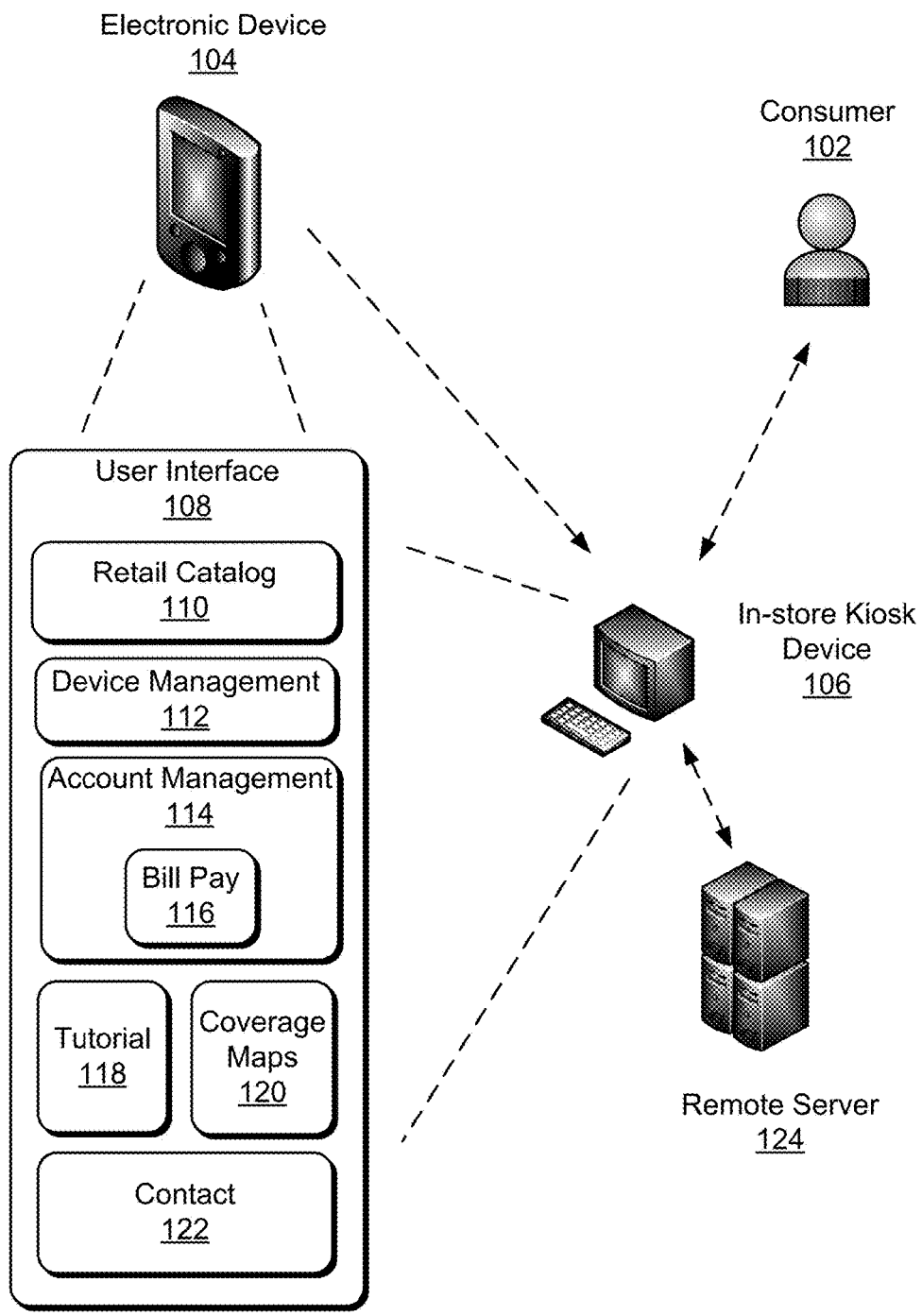
FIG. 1 illustrates an overview of an in-store kiosk device that provides consumers with service-related assistance.

FIG. 1 illustrates an example service-environment for implementing an in-store kiosk device 106 with a consumer 102 and/or a consumer electronic device 104. As illustrated, a consumer 102 may interact directly with the in-store kiosk device 106 via a user interface 108, such as a touch-sensitive display, microphone, keyboard or joystick-like controller. The user interface 108 may be displayed on the in-store kiosk device 106, or alternatively, it may be presented on the consumer electronic device 104 via an installed application. The user interface 108 may present several service-related self-help options including, but not limited to, a Retail Catalog 110, Device Management 112, Account Management 114, Bill Pay 116, Tutorial 118, Coverage Maps 120, and a Contact 120 option. Each of these options relate to individual services that the consumer may perform independently, using the in-store kiosk device 106.

For example, the Retail Catalog 110 option may integrate with a retailer's online content catalog and sales team to support purchases made through the in-store kiosk device 106. In at least one example, a consumer 102 may select the Retail Catalog 110 option and search for detailed information regarding a particular inventory item. In some examples, the consumer 102 may be able to complete the sales transaction for the inventory item using the in-store kiosk device 106.

In at least one example, the Device Management 112 option may allow consumers to troubleshoot a problem with an electronic device. For instance, a communicative connection may be established between the in-store kiosk device 106 and the electronic device 104. The communicative connection may allow for data to be transmitted to and from the electronic device 104. The communicative connection may be established through local wireless data networks or a personal area networks (e.g. Bluetooth or near field communication (NFC) networks). Further, the communicative connection may be established via wired components, such as an Ethernet port or a Universal Serial Bus (USB).

Once a communicative connection has been established between the in-store kiosk device 106 and the electronic device 104, the Device Management 112 option may initiate a diagnostic analysis of the electronic device 104 to determine the underlying problem. The diagnostic analysis may interrogate configuration settings and features of the electronic device 104, such as, but not limited to, existing application settings, operating system and firmware integrity, service provider protocols, system, user customization settings, use profile information and accessibility settings.

In at least one example, the diagnostic analysis may troubleshoot poor signal quality by accessing service logs associated with the electronic device 104. The service logs may help distinguish signal quality problems caused by the electronic device 104 or the service provider network. For example, if an electronic device 104 repeatedly experiences poor signal quality within a particular geographic location, the diagnostic analysis may determine that the poor signal quality is due to a known network drop-zone, rather than a problem with the electronic device 104.

Once a diagnostic analysis has been performed, the in-store kiosk device 106 may display an indication to the consumer 102 of one or more corrective options that may resolve the problem. The one or more corrective options may include, but are not limited to, configuring the electronic device by installing a new application, removing an existing application, configuring existing system preferences, configuring user preferences associated with the electronic device, or recommending a different network-service plan if the electronic device is experiencing poor signal quality due to poor existing network-service coverage.

In at least some examples, the diagnostic analysis may be performed by a remote server 124, and the results of the analysis transmitted to the in-store kiosk device 106. In these instances, a further communicative connection may be established between the in-store kiosk device 106 and a remote telecommunication server 124. Data that is relevant to a diagnostic analysis is the received by the in-store kiosk 106 from electronic device 104. The diagnostic information is then packaged and transmitted to a remote server 124 that performs the diagnostic analysis. Once the diagnostic analysis is complete, an indication of one or more corrective options to resolve the problem is transmitted from the remote server 124 to the in-store kiosk device 106. The in-store kiosk device 106 then presents the indication of the one or more corrective options to the consumer 102.

In at least one example, the Device Management 112 option may also facilitate a device exchange. For example, the in-store kiosk device 106 may provide an openable tray that unlocks to receive an electronic device 104 from the consumer 102. Upon receipt of the electronic device 104 in the openable tray, the in-store kiosk device 106 may provide the consumer 102 with a ticket or coupon that indicates that the consumer 102 is entitled to a new electronic device 104 from the retail store.

The Account Management 114 option may allow consumers 102 to review account details and update details associated with a particular service. For example, a consumer 102 review available credit associated with a smart phone plan, update a residential address associated with the account, or update a payment instrument that is linked to the account.

The Bill Pay 116 option may allow consumers to lodge a payment related to a bill or an inventory item for sale. The in-store kiosk device may facilitate Near Field Communication (NFC) based payments and any other form of electronic-based or cash-based payments.

In some examples, the Tutorial 118 option may provide a consumer with instructions on how to use the in-store kiosk device 106. In at least one example, the Tutorial 118 option may also guide consumers through implementing one or more corrective options recommended by a diagnostic analysis. The tutorials may be presented pictorially, as a series of sequential steps. In other examples, the tutorials are interactive with audio-visual cues that guide a consumer 102 through the necessary steps in performing a particular task.

The Coverage Maps 120 option may provide consumers 102 with a coverage map that corresponds to a particular service. In at least one example, the coverage maps 120 may indicate geographic regions in which smart phone data service is available. In other examples, the Coverage Maps 120 option may allow consumers to browse through coverage areas related to different network-service plans that the retailer may be promoting.

The Contact 122 option may allow consumers to communicate specific questions to one or more appropriately selected experts that retain a relevant knowledge base. The specific questions may relate to, but are not limited to, Device Management 112, Account Management 113, and Coverage Maps 120. The in-store kiosk device 106 may facilitate selecting an appropriate expert in a number of ways. A consumer may be presented with an index listing of appropriate experts, or an index listing of category topics, such as, but not limited to, Device Management 112, Account Management 113 and Coverage Maps 120. Also, as discussed in more detail below, the selection of an appropriate expert may also be based on contextual tracking of user interactions with the in-store kiosk device 106.

In at least some examples, an appropriate expert may be selected based on the context of consumer interactions with the in-store kiosk device 106. For instance, if a consumer 102 is experiencing poor signal quality due to a lack of network-service coverage, the contextual tracking feature may recommend contacting a sales representative who may suggest enrolling in a better network-service coverage plan.

In some examples, the Contact 122 option allows consumers to interact simultaneously with multiple appropriate experts via the display of the in-store kiosk device 106. The in-store kiosk device 106 is equipped with video-audio functionality to enable video conferencing between appropriate experts. The Contact 122 option may optionally facilitate audio only communications. In the event a video-audio communication is implemented with multiple appropriate experts, the video imagery of each appropriate expert may appear in separate sections of the display screen, such that the video imagery associated with each individual appropriate expert can be viewed by the consumer without obstruction. In the event that an appropriate expert is unavailable for a predetermined amount of time, the in-store kiosk device may display a still image in place of the video imagery. If the expert is unavailable for a period of time that exceeds the predetermined amount of time, the request for expert assistance may be re-directed to another appropriate expert.

Figure 2:
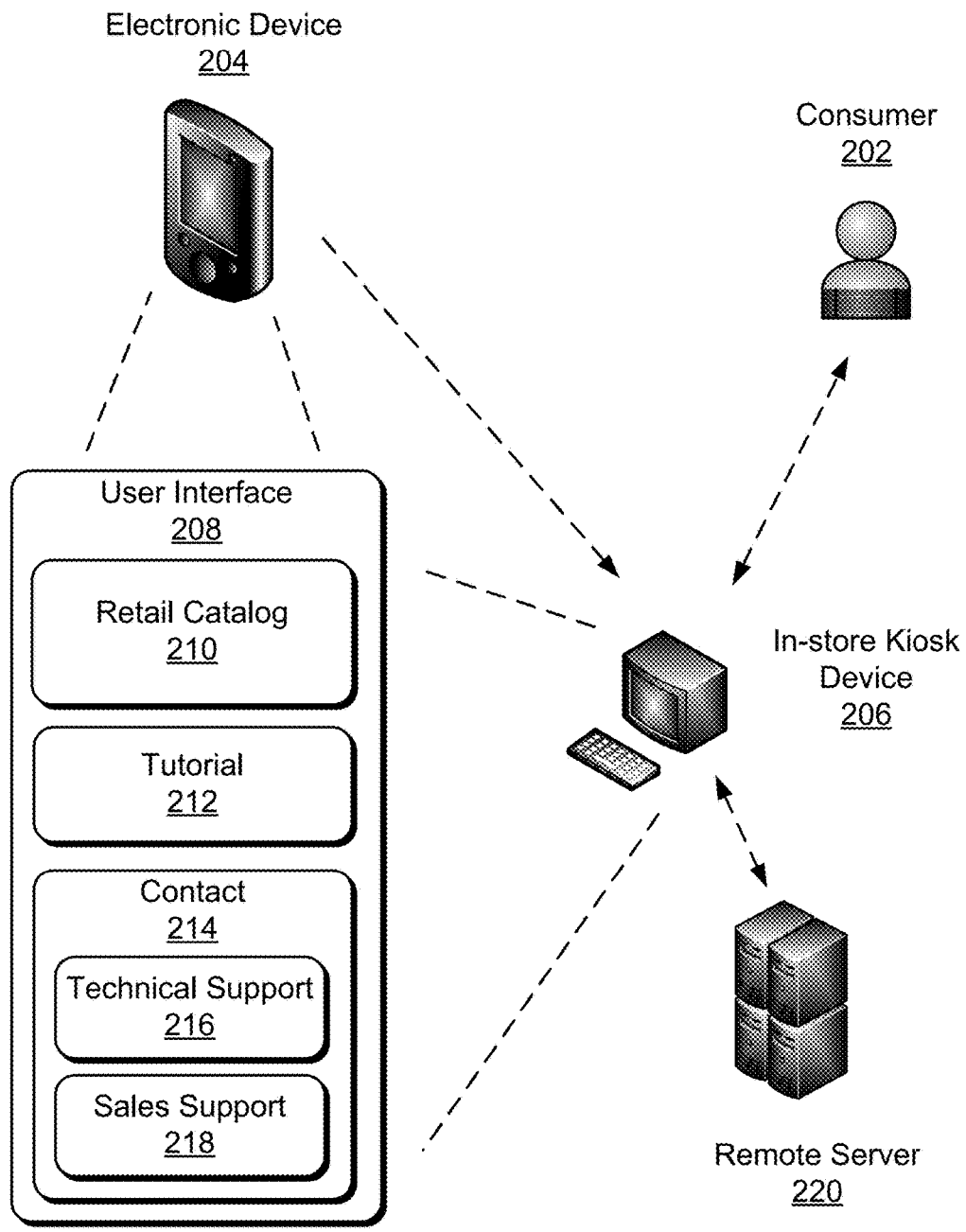
FIG. 2 illustrates an overview of an in-store kiosk device that provides consumers with a virtual retail assistance experience.

FIG. 2 illustrates an example retail environment for implementing an in-store kiosk device 206 with a consumer 202. As illustrated, a consumer 202 may interact directly with the in-store kiosk device 206 via a user interface 208, such as a touch-sensitive display, microphone, keyboard, or joystick-like controller. The user interface 208 may be displayed on the in-store kiosk device 206, or alternatively, it may be presented on the consumer electronic device 204 via an installed application. The user interface 208 may present several retail self-help options, including, but not limited to, a Retail Catalog 210, Tutorial 212 and Contact 214 Option.

For example, the Retail Catalog 210 may integrate with a retailer's online content catalog and sales team to support purchases made through the in-store kiosk device 206. In at least one example, a consumer 202 may select the Retail Catalog 210 option and search for detailed information regarding a particular inventory item or a category of inventory items. In other examples, a consumer may search for multiple inventory items that share a common feature. For example, a search for television units may be limited to those with a 1080p screen resolution.

The Tutorial Option 212 may provide a consumer with instructions on how to use the in-store kiosk device 206. In at least one example, the Tutorial 212 option may also provide consumers with additional information on the inventory items within the Retail Catalog 210. For example, the Tutorial 212 option may provide information on the benefit of particular features found in inventory items within the Retail Catalog 210. For instance, if a consumer is searching for television units with different screen resolutions, the Tutorial 212 option may illustrate the benefit of a high definition screen resolution over a standard definition screen resolution. The tutorials may be presented pictorially, as a series of still images. In other examples, the tutorials are interactive with audio-visual cues that guide a consumer 202 through the particular features of an inventory item or category of inventory items.

The Contact 214 Option may allow consumers to communicate specific questions related to inventory items, to one or more appropriately selected experts that retain a relevant knowledge base. The specific questions may relate to, but are not limited to, specific inventory items found in the Retail Catalog 210, or a category of inventory items found in the Retail Catalog 210. In at least one example, a consumer 202 may submit a question about inventory items that retain a specific feature, such as 1080p screen resolution for television units. In other examples, a consumer 202 may inquire of other technical specifications or retail-related features, such as service warranties. A consumer inquiry may also relate to comparing multiple inventory items found in the Retail Catalog 210. Alternatively, the consumer inquiry may relate to comparing inventory items found in the Retail Catalog 210 with similar inventory items sold by other retailers, but not listed in the Retail Catalog 210.

Once a consumer has submitted a specific question or inquiry related to an inventory item or category of inventory items, the in-store kiosk device 206 may facilitate selecting an appropriate expert in a number of ways. For example, a consumer 202 may be presented with an index listing of appropriate experts, or an index listing of catalog items with each catalog item being appropriately associated to one or more appropriate experts. Also, as discussed in more detail below, the selection of an appropriate expert may also be based on contextual tracking of user interactions with the in-store kiosk device 206.

In at least some examples, an appropriate expert may be selected based on the context of consumer interactions with the in-store kiosk device. For instance, using the above example, the context tracking feature may associate a consumer 202 browsing through a particular section of the Retail Catalog 210 with a particular sales team. If the consumer settles on a particular electronic device within the Retail Catalog 210, the context tracking feature may suggest a particular sales team representative 218 as well as a technical service staff 216, both of whom are familiar with the particular electronic device.

In some examples, the Contact 214 option also allows the consumers to interact simultaneously with multiple appropriate experts via the display of the in-store kiosk device 206. The in-store kiosk device 206 is equipped with video-audio functionality to enable video conferencing between appropriate experts. The Contact 214 option may optionally facilitate audio only communications. In the event a video-audio communication is implemented with multiple appropriate experts, the video imagery of each appropriate expert may appear in separate section of the display screen, such that the video imagery associated with each individual appropriate expert can be viewed by the consumer without obstruction. In the event that an appropriate expert is unavailable for a predetermined amount of time, the in-store kiosk device may display a still image in place of the video imagery. If the expert is unavailable for period of time that exceeds the predetermined amount of time, the request for an expert assistance may be re-directed to another appropriate expert.

Figure 3:
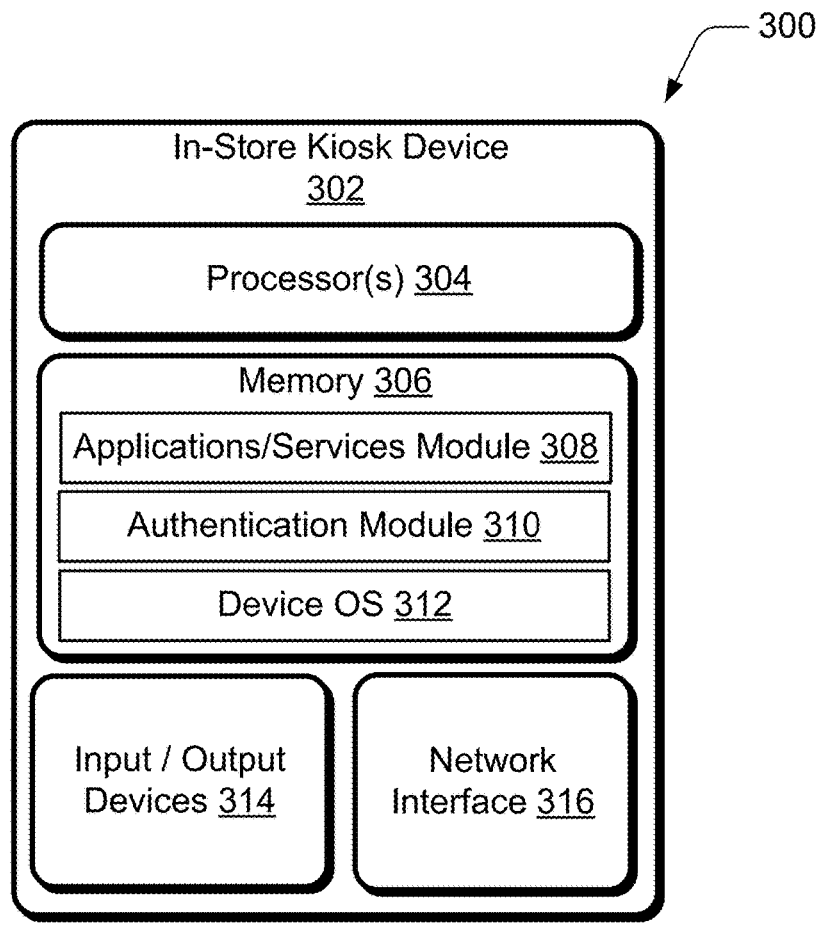
FIG. 3 illustrates an example In-Store Kiosk Device with Applications/Services Module and Authentication Module.

FIG. 3 illustrates an example of an in-store kiosk device 302 configured for a service environment and/or a retail environment. In various examples, the in-store kiosk device 302 can correspond to in-store kiosk device 106 and in-store kiosk device 206. As illustrated in FIG. 3, the in-store kiosk device 302 may include processor(s) 304 and memory 306. The memory 306 may include applications/services module 308, an authentication module 310, and a device OS 312. The in-store kiosk device 302 may also include an input/output device 314 module and a network interface module 316.

In at least one example, the processor(s) 304 is a central processing unit (CPU) a graphics processing unit (GPU), or a both a CPU and GPU, or any other sort of processing unit. Each of the one or more processors(s) may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The processor(s) 202 may also be responsible for executing all computer applications stored in the memory 204, which can be associated with common types of volatile (RAM) and/or nonvolatile (ROM) memory.

In some examples, memory 306 may include system memory, which may be volatile (such as RAM), non-volatile (such as ROM, flash memory, etc) or some combination of the two. The memory may also include additional data storage devices (removable ad/or non-removable) such as, for example, magnetic disks, optical disks, or tape.

Memory 306 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the kiosk device. Any such non-transitory computer-readable media may be part of the kiosk device.

In some examples, the applications/services module 308 may include any type of application and/or service, or both. For instance, the applications/services module 308 may include a repository of applications related to a plurality of electronic devices, diagnostic analysis tools to interrogate electronic devices, network-service area coverage maps, service account management tools, retail inventory repositories, retail catalog information, and applications that facilitate video-audio or audio communications with appropriate experts for technical or sales assistance.

In some examples, the authentication module 310 is configured to perform authentication on a plurality of electronic devices using an authentication scheme specific to each electronic device type.

As is further illustrated in FIG. 3, the input/output devices module 314 may include any type of output devices known in the art, such as a display (e.g. a liquid crystal display), speakers, a vibrating mechanism, or a tactile feedback mechanism. Input/output devices also include ports for one or more peripheral devices, such as headphones, peripheral speaks, or a peripheral display. Further, the input/output devices module 314 includes any type of input devices known in the art. For example, input/output devices may include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In at least some examples, the network interface module 316 may include any sort of transceiver known in the art. For example, the network interface module may include a radio transceiver that performs the function of transmitting and receiving radio frequency communications via an antenna. The network interface may facilitate wireless connectivity between the kiosk device and other electronic devices through a telecommunication network, such as a remote telecommunication server. In addition, the network interface may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface may include wired communication components, such as an Ethernet port or a Universal Serial Bus (USB).

Figure 4:
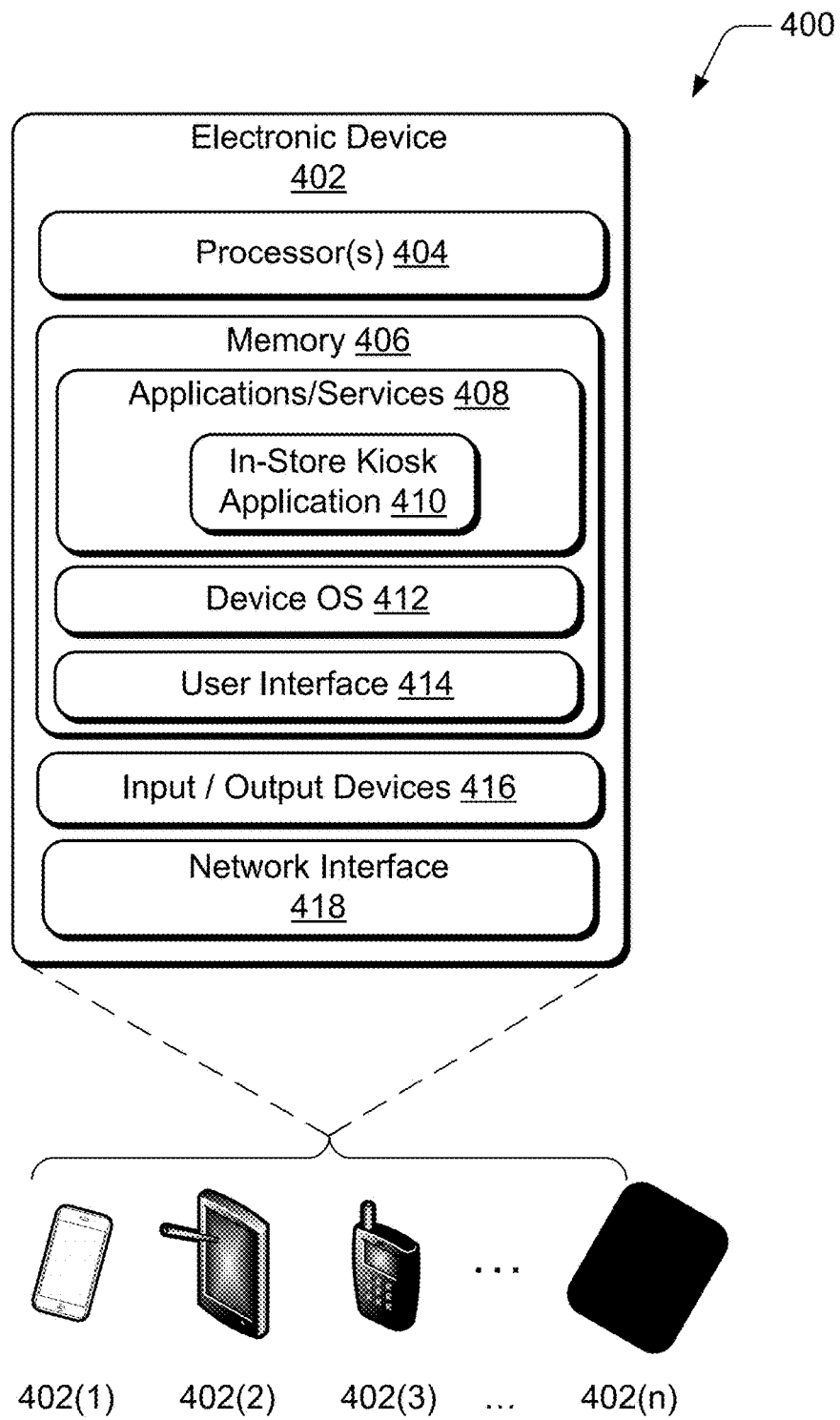
FIG. 4 illustrates an example Electronic device with In-Store Kiosk Device with Applications/Services Module and Authentication Module.

FIG. 4 illustrates an electronic device 404 that is capable of communicating with the in-store kiosk device 106. The electronic device 402 may be any sort of electronic device 402(1), 402(2), 402(3), and/or 402(n), such as a cellular phone, a smart phone, a tablet computer, an electronic reader, a media player, a gaming device, a personal computer (PC), a laptop computer, etc. In various examples, the electronic device 402 can correspond to electronic device 104 and electronic device 204. The electronic device 402 may also be a mobile telecommunication device, capable of being moved from location to location and used in a plurality of locations. The electronic device 402 may have a subscriber identity module (SIM), such as an eSIM, to identify the electronic device 402 to a telecommunication service provider network (also referred to herein as "telecommunication network").

As is further illustrated in FIG. 4, the electronic device 402 may include an Applications/Services module 408. The Applications/Services module 408 may include an In-Store Kiosk Application 410 that initiates a communicative connection with a nearby in-store kiosk device 106, 206, and/or 302. The Application may initiate a communicative connection over an unlicensed wireless Internet Protocol (IP) networks, such as local wireless data networks and personal area networks (e.g. Bluetooth or near field communication (NFC) networks). Further, the communicative connection may be initiated via wired communication components, such as an Ethernet port or a Universal Serial Bus (USB).

Example Processes

Figure 5:
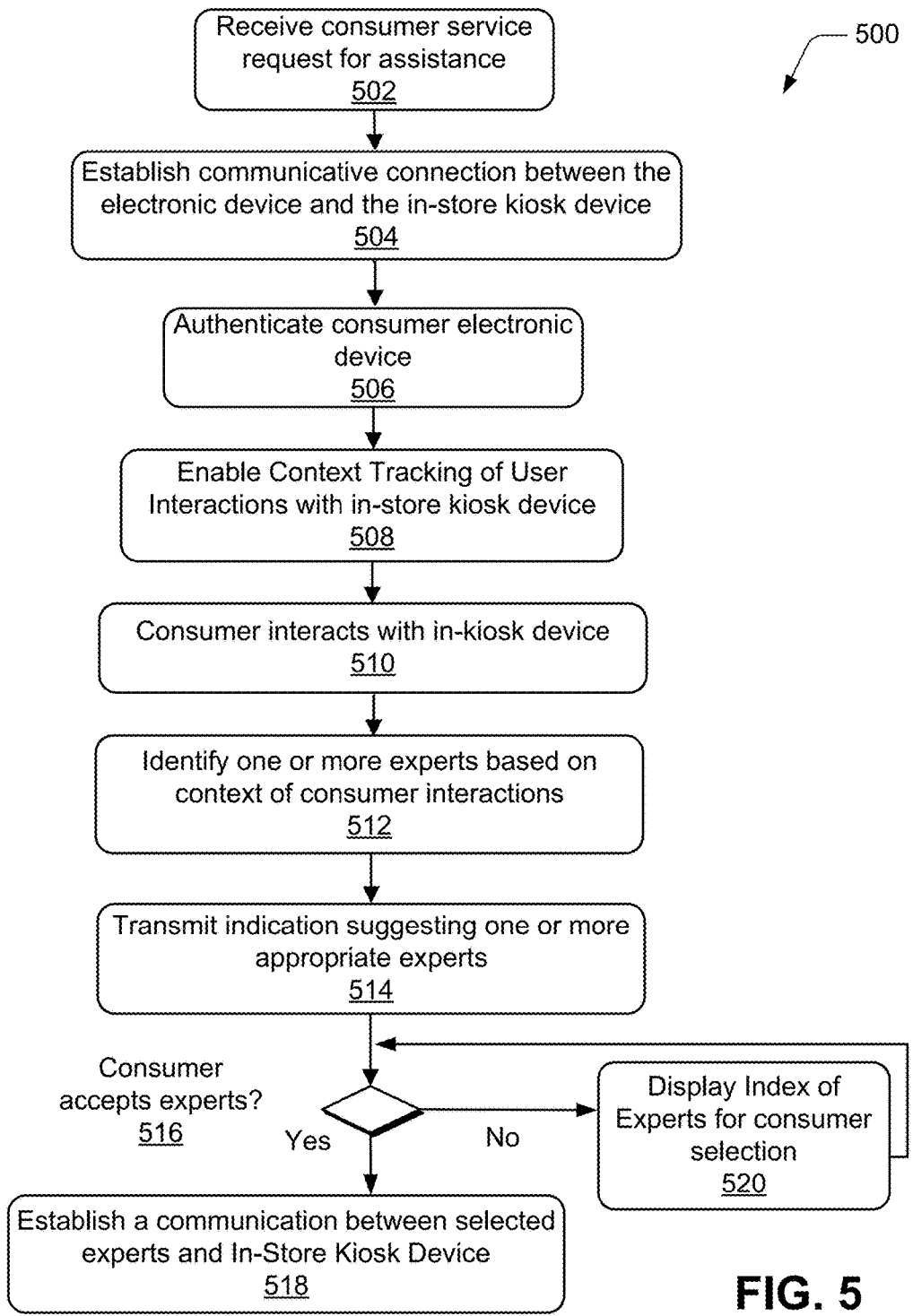
FIG. 5 illustrates a flow chart of an example process for establishing a communication for service assistance between one or more appropriate experts and a consumer, via the in-store kiosk device.

FIG. 5 illustrates a flow chart of an example process of the service-related self-help options implemented by an in-store kiosk device. At 502, the in-store kiosk device receives a service request for assistance with an electronic device. The request may be received via any input device associated with the in-store kiosk device or via an In-Store Kiosk Application installed on the electronic device itself.

At 504, the in-store kiosk device may initiate a communicative connection with the electronic device. The communicative connection may be initiated through local wireless data networks or a personal area networks (e.g. Bluetooth or near field communication (NFC) networks). Further, the communicative connection may be established via wired communication components, such as an Ethernet port or a Universal Serial Bus (USB). In at least one example, the electronic device may initiate a communicative connection with the in-store kiosk device via an in-store kiosk application installed on the electronic device.

At 506, the In-Store Kiosk Device may authenticate the electronic device using an authentication scheme that is specific to the electronic device type. If the selected authentication scheme determines that the requesting device is authorized to access the service, access to the service is provided. If the selected authentication scheme determines that the electronic device is not authorized to access the service, access to the service is prevented. In at least one example, authentication of the electronic device is determined by initiating a communicative connection between the requesting device and the in-store kiosk device via the In-Store Kiosk Application installed on the electronic device.

At 508, the in-store kiosk device enables context tracking of user interactions with the in-store kiosk device. Context tracking captures and tags all Applications and Services that a consumer may navigate through while using the In-Store Kiosk Device.

At 510, the consumer may interact with one or more service related self-help options provided by the in-store kiosk device. The self-help options may include, but are not limited to, Device Management, Account Management, Bill Pay, Tutorial, Coverage Maps and a Contact Option.

In some circumstances, a consumer may decide to select the Contact Option to initiate a communication with one or more appropriate experts. At 512, when a consumer decides to contact one or more appropriate experts, the captured context tracking is used to identify one or more appropriate experts who are likely to retain a relevant knowledge base. For example, when a consumer is navigating through the billing screen of Account Management selection, the context tracking feature may suggest an appropriate expert from the Account Management Department.

At 514, an indication of the suggested one or more appropriate experts is presented to the consumer through the in-store kiosk device display screen. At 516, the consumer indicates whether the suggested one or more appropriate experts are acceptable. At 518, if the consumer indicates that the suggested one or more appropriate experts are acceptable, then a communication is initiated between the one or more appropriate experts and the consumer, via in-store kiosk device.

At 516, if however, the consumer indicates that the suggested one or more appropriate experts are not acceptable, then the in-store kiosk device may display an index listing of appropriate experts for the consumer to select independently. The index listing of appropriate experts may be arranged in any manner. For example, the index listing may be ordered by application or service type, with each application or service type being assigned one or more appropriate experts.

At 520, the consumer selects one or more appropriate experts from the suggested index listing. The consumer is then prompted to confirm the selection of appropriate experts at 516. At 518, in response to accepting the selected one or more appropriate experts, a communication is initiated between the consumer, via the in-store kiosk device, and the selected one or more appropriate experts.

Figure 6:
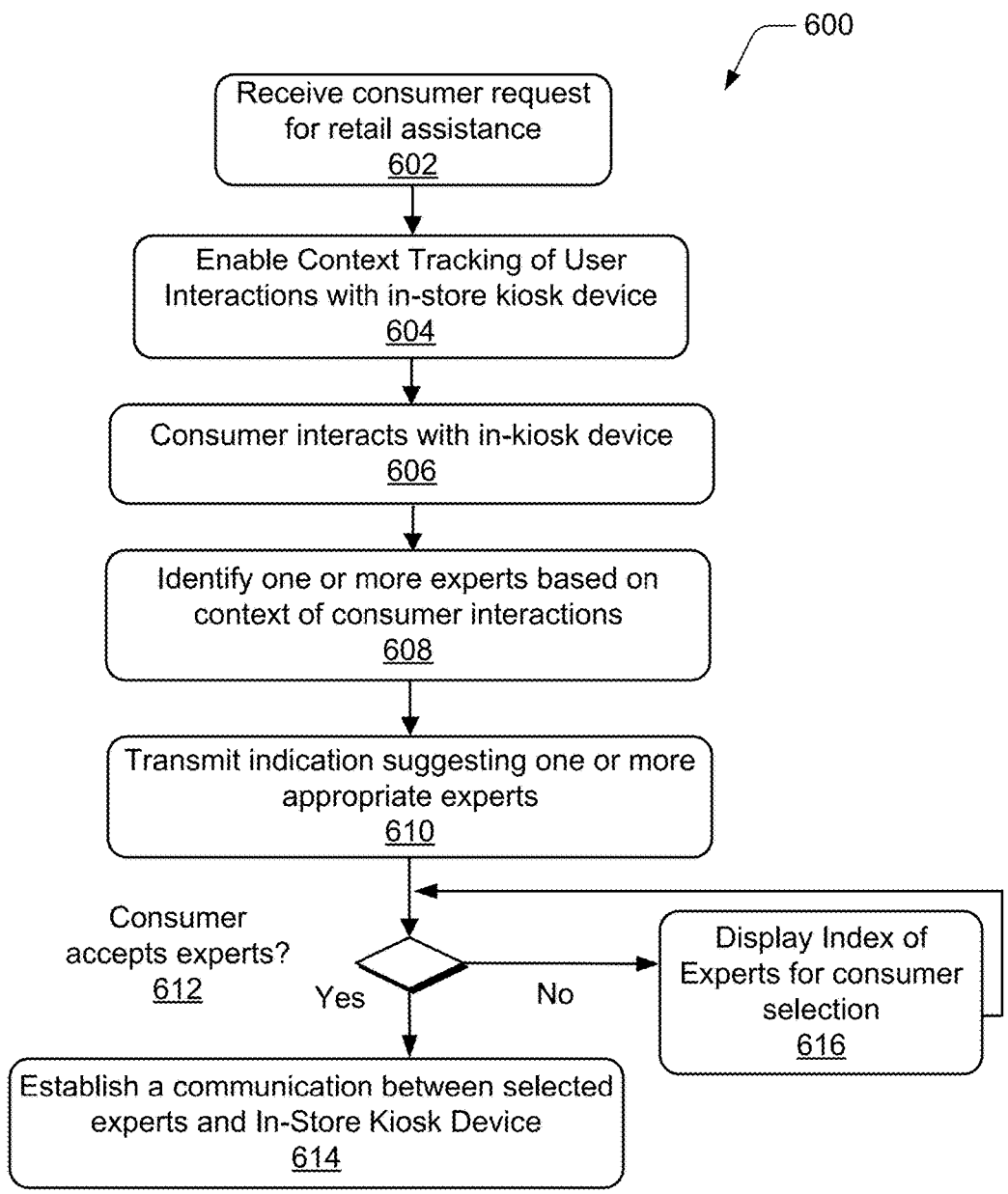
FIG. 6 illustrates a flow chart of an example process for establishing a communication for retail assistance between one or more appropriate experts and a consumer, via the in-store kiosk device.

FIG. 6 illustrates a flow chart of an example process of the Retail Reinvention virtual shopping experience. At 602, the in-store kiosk device receives a consumer request for retail assistance.

At 604, the in-store kiosk device enables context tracking of user interactions with the in-store kiosk device. Context tracking captures and tags all Applications and Services that a consumer may navigate through while using the in-store kiosk device.

At 606, the consumer may interact with one or more service related self-help options provided by the in-store kiosk device. The consumer may browse through the Retail Catalog option available on the in-store kiosk device, and identify particular inventory items or categories of inventory items.

In at least some examples, a consumer may select the Contact Option on the in-store kiosk device to initiate a communication with one or more appropriate experts. The one or more appropriate experts may provide technical support or sales support. At 608, when a consumer decides to contact one or more appropriate experts, the captured context tracking is used to identify one or more appropriate experts who are likely to retain a relevant knowledge base. For example, when a consumer is navigating a category of television units with a 1080p screen resolution, the context tracking feature may suggest a particular sales team representative that is familiar with the category of television units as well as technical service staff who may be familiar with specific features, such as the 1080p screen resolution.

In at least one example, if a consumer is requesting assistance with a category of items, the in-store kiosk device may suggest one or more appropriate experts that are associated with competing manufacturers of inventory items within the category of items. In this instance, the consumer may benefit from understanding the advantages and disadvantages of competing inventory items directly from the competing manufacturers.

At 610, an indication of the suggested one or more appropriate experts is presented to the consumer through the in-store kiosk device display screen. At 612, the consumer indicates whether the suggested one or more appropriate experts are acceptable. At 614, if the consumer indicates that the suggested one or more appropriate experts are acceptable, then a communication is initiated between the one or more appropriate experts and the consumer, via in-store kiosk device.

At 612, if however, the consumer indicates that the suggested one or more appropriate experts are not acceptable, then the in-store kiosk device may display an index listing of appropriate experts for the consumer to select independently. The index listing of appropriate experts may be arranged in any manner. For example, the index listing may be ordered by application or service type, with each application or service type being assigned one or more appropriate experts. At 616, the consumer selects one or more appropriate experts from the suggested index listing. At 612, the consumer is then prompted to confirm the selection of appropriate experts. At 614, in response to accepting the selected one or more appropriate experts, a communication is initiated between the consumer, via the in-store kiosk device, and the selected one or more appropriate experts.

Figure 7:
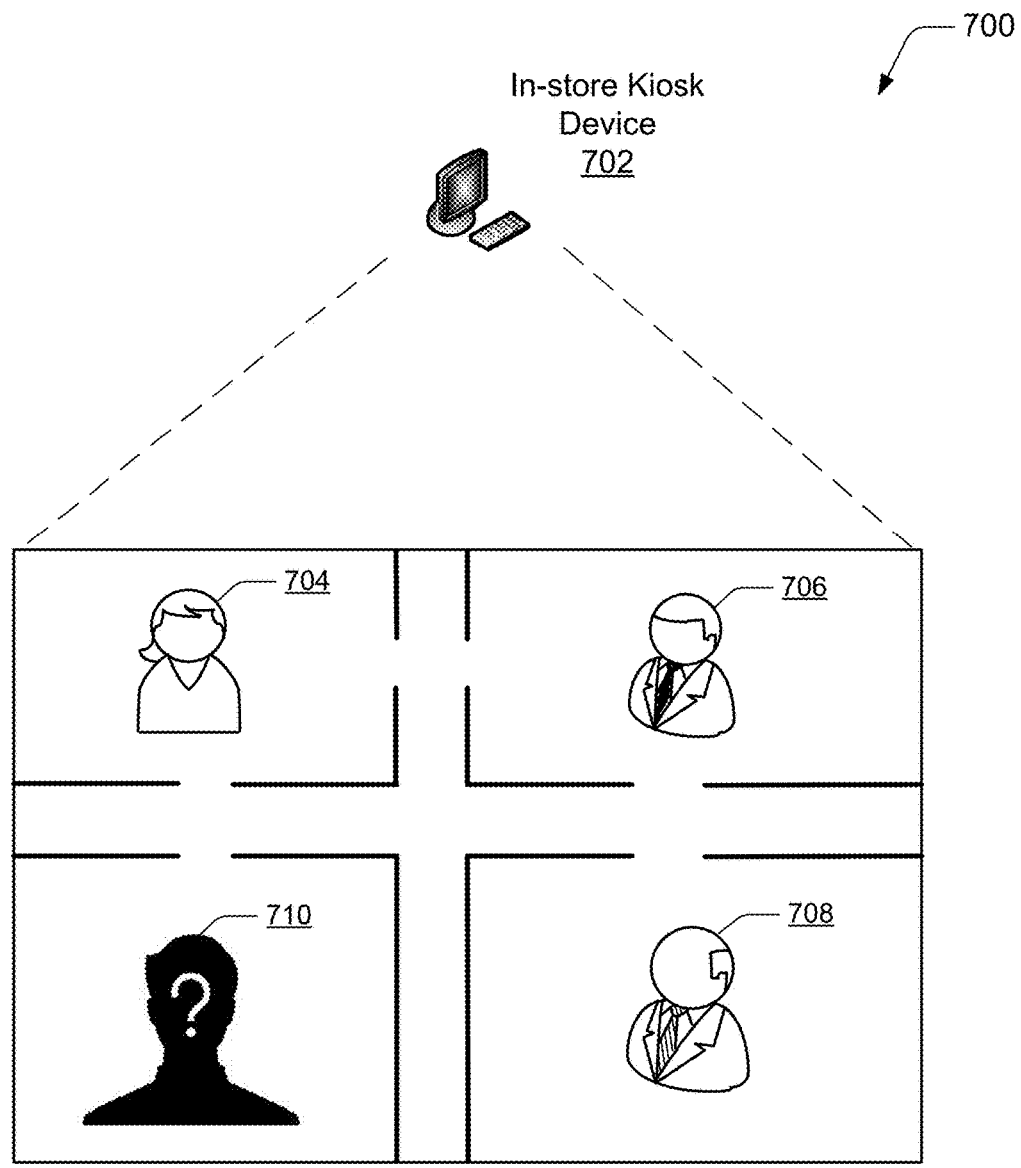
FIG. 7 illustrates an example display of an In-Store Kiosk Device a plurality of appropriate experts.

FIG. 7 illustrates an example embodiment of establishing a communication between multiple experts and the in-store kiosk device. The in-store kiosk device is equipped with video-audio functionality to enable a voice call, a video call, a video chat or a text messaging conversation. In the event that a video chat or video call is established with more than one expert, each expert may appear in a separate section or window of the display screen. This allows the user of the in-store kiosk device to view each expert image without obstruction.

In at least one example, a communicative connection is initiated between one or more appropriate experts 702, 704, 706, and 708 and the consumer via in-store kiosk device 702. In various examples, the in-store kiosk device 702 can correspond to the in-store kiosk device 106, 206, and 302. In instances, where an appropriate expert 710 is unavailable to answer the communication, the in-store kiosk device 702 may display a still image indicating that the expert is unavailable to provide assistance 710, for a predetermined amount of time. If the expert is unavailable for period of time that exceeds the predetermined amount of time, the request for assistance may be re-directed to another appropriate expert.

In at least one example, the appropriate experts 704, 706, 708, and 710 are selected by the in-store kiosk device 702, or a network component such as a server(s). The appropriate experts 704, 706, 708, and 710 may be identified from an expert database stored on a remote server 124, as illustrated earlier in support of FIG. 1. In some examples, appropriate experts 704, 706, 708, and 710 may submit bids to the server(s) in order to provide assistance to a consumer. For instance, if a consumer has a specific question regarding the high-definition televisions, appropriate experts from different manufacturers may bid to provide technical assistance to the consumer. The bids may indicate an amount of money that the respective appropriate experts are willing to pay to provide assistance to a user of the in-store electronic device.

In some embodiment, an appropriate expert may choose to associate different bid amounts for different types of service. For example, an appropriate expert may bid X to provide sales assistance, and may bid Y to provide technical assistance.

The selected appropriate experts may be determined based on the bid price, technical knowledge base and other factors such as for example, whether the appropriate expert has enough money to pay the bid price. In some examples, the appropriate expert is selected based on submitting a bid with the largest amount of money. Other bidding arrangements are also possible such as, for example, submitting a nominal bid amount and a maximum bid amount, whereby the nominal bid amount increases to a bid amount higher than the next highest bid amount, up to the maximum bid amount.

Figure 8:
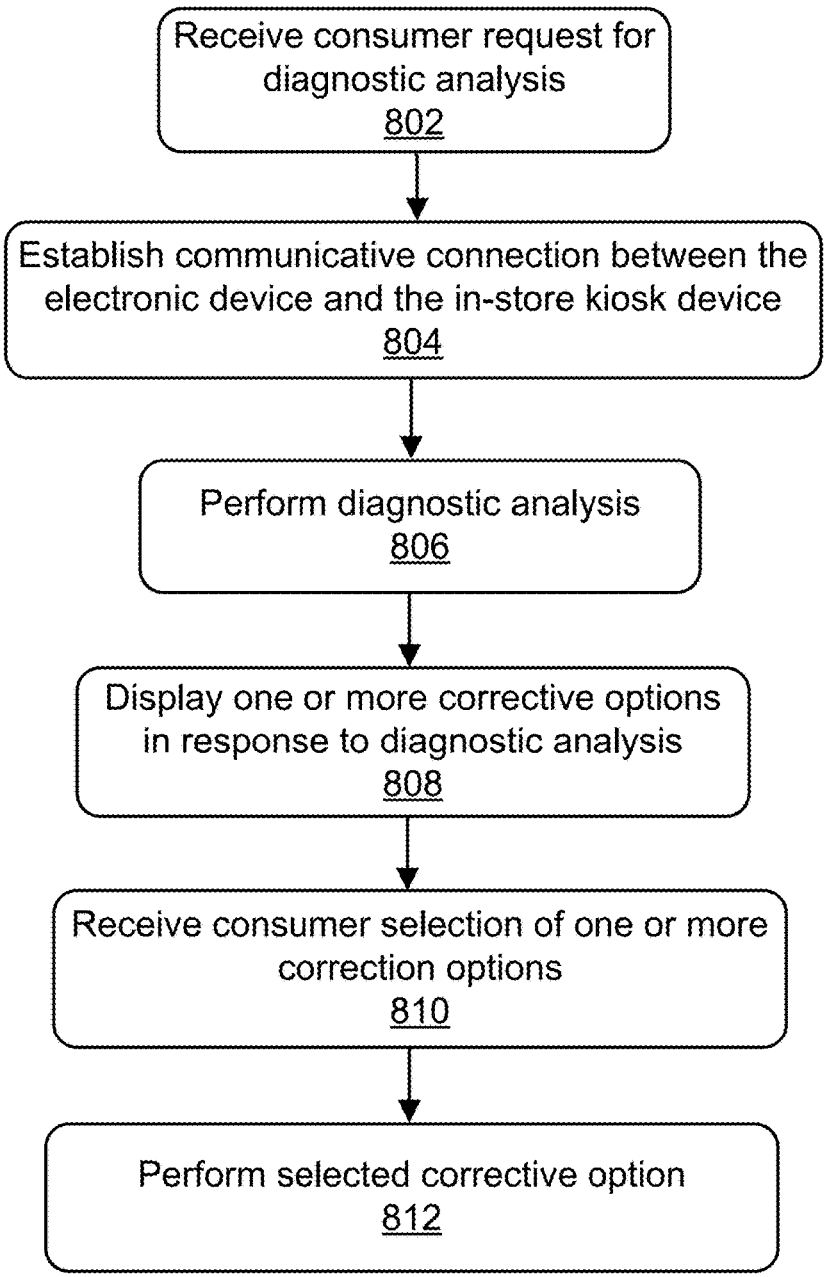
FIG. 8 illustrates a flow chart of an example process of performing a diagnostic analysis on an electronic device.

FIG. 8 illustrates a flow chart of an example process of performing a diagnostic analysis on an electronic device. At 802, the in-store kiosk device receives a request for a diagnostic analysis of an electronic device. The request may be received via any input device associated with the in-store kiosk device or via an In-Store Kiosk Application installed on the electronic device itself.

At 804, the in-store kiosk device may initiate a communicative connection with the electronic device. The communicative connection may be initiated through local wireless data networks or a personal area networks (e.g. Bluetooth or near field communication (NFC) networks). Further, the communicative connection may be established via wired communication components, such as an Ethernet port or a Universal Serial Bus (USB). In at least one example, the electronic device may initiate a communicative connection with the in-store kiosk device via an in-store kiosk application installed on the electronic device.

At 806, once a communicative connection has been established between the in-store kiosk device and the electronic device, a diagnostic analysis of the electronic device may be initiated. The diagnostic analysis may interrogate configuration settings and features of the electronic device 104, 204, and/or 402, such as, but not limited to, existing application settings, operating system integrity, service provider protocols, system, user customization settings, use profile information and accessibility settings.

In at least some examples, the diagnostic analysis may be performed by a remote server, and the results of the analysis transmitted to the in-store kiosk device. In these instances, a further communicative connection may be established between the in-store kiosk device and a remote telecommunication server. Data that is relevant to a diagnostic analysis is the received by the in-store kiosk from electronic device. The diagnostic information is then packaged and transmitted to a remote server that performs the diagnostic analysis. Once the diagnostic analysis is complete, an indication of one or more corrective options to resolve the problem is transmitted from the remote server to the in-store kiosk device.

At 808, once the diagnostic analysis has been performed, the in-store kiosk device may display an indication to the consumer of one or more corrective options that may resolve the problem. The one or more corrective options may include, but are not limited to, configuring the electronic device by installing a new application, removing an existing application, configuring existing system preferences, or configuring user preferences associated with the electronic device.

At 810, the consumer may select one of the one or more corrective options displayed on the in-store kiosk device. At 812, the in-store kiosk device may perform the selected corrective option. In some embodiments, a corrective option may be to exchange the electronic device. In these instances, the in-store electronic device may provide an openable tray that unlocks to receive an electronic device from the consumer. Upon receipt of the electronic device in the openable tray, the in-store kiosk device may provide the consumer with a ticket or coupon that indicates that the consumer is entitled to a new electronic device from the retail store.

CONCLUSION

Although the subject matter has been described in language specific to features and/or methodological acts, it is to be understood that the subject matter defined in the appended claims is not necessarily limited to the specific features or acts described herein. Rather, the specific features and acts are disclosed as exemplary forms of implementing the claims.

What is claimed is:
1. A method comprising:
receiving from a kiosk device, by one or more computing devices, a request for assistance from a user of the kiosk device, the request being associated with an electronic device of the user that is communicatively coupled to the kiosk device;
receiving, by the one or more computing devices, diagnostic information about the electronic device that is retrieved from or provided by the electronic device;
identifying, by the one or more computing devices, one or more appropriate experts to receive the request for assistance, based at least in part the diagnostic information;
determining that at least one of the one or more appropriate experts is unavailable to receive a communication;
transmitting a call-waiting audio communication through the kiosk device;

determining that the at least one of the one or more appropriate experts is available to receive the communication within a predetermined threshold period of time;

establishing, by the one or more computing devices and through the kiosk device, the communication between the one or more appropriate experts and the user associated the electronic device; and providing the diagnostic information to the one or more appropriate experts.

2. The method recited in claim 1, wherein the communication further comprises at least one of a voice call, a video call, a video chat, or a text messaging conversation.

3. The method recited in claim 1, wherein the establishing the communication occurs among two or more appropriate experts and the user, and further comprising, transmitting the communication from the two or more appropriate experts to the user substantially simultaneously through the kiosk device.

4. The method recited in claim 1, wherein the one or more appropriate experts include at least one of a technical expert of the electronic device, a technical expert of a service provider that provides services to the electronic device, an accounts expert of the service provider, or a sales expert that is selected based on information received from the request for assistance.

5. The method recited in claim 1, further comprising receiving one or more interactions between the user and the kiosk device wherein the one or more interactions is continually tracked by the kiosk device or by the one or more computing device, and wherein the one or more interactions is continually tracked after an initial interaction between the user and the kiosk device.

6. The method recited in claim 1, wherein the establishing the communication further comprises, in response to at least one appropriate expert of the one or more appropriate experts being unavailable to receive the communication for a period of time that exceeds a predetermined threshold, transferring the communication associated with the at least one appropriate expert to another appropriate expert.

7. The method recited in claim 1, further comprising determining that the request for assistance relates to a context that includes at least one of a billing inquiry, an account information inquiry, a technical service inquiry or a hardware related inquiry based at least in part on one or more interactions between the user and kiosk device, the diagnostic information, or both, and the identifying includes identifying one or more appropriate experts based at least in part on the context.

8. One or more non-transitory computer-readable media storing computer-executable instructions that, when executed on one or more processors, performs acts comprising:

receiving a request for assistance from a user of an in-store kiosk device, the request being related to an electronic device;

receiving diagnostic information provided by or retrieved from the electronic device;

identifying one or more appropriate experts to receive the request for assistance, based at least in part on the diagnostic information;

determining that at least one of the one or more appropriate experts is unavailable to receive a communication;

transmitting a call-waiting audio communication through the kiosk device;

determining that the at least one of the one or more appropriate experts is available to receive the communication within a predetermined threshold period of time;

establishing, through the in-store kiosk device, the communication between the one or more appropriate experts and the user; and providing the diagnostic information to the one or more appropriate experts.

9. The one or more non-transitory computer-readable media of claim 8, wherein the diagnostic information includes at least one of service provider protocols, system integrity data, user customization setting, user profile information or accessibility settings.

10. The non-transitory computer-readable storage medium of claim 8, wherein the request for assistance is related to a category of products and the identifying the one or more appropriate experts includes identifying appropriate expert associated with individual products within the category of products.

11. The non-transitory computer-readable storage medium of claim 8, wherein the identifying the one or more appropriate experts further comprises:

receiving bids from a plurality of appropriate experts to provide assistance to the user of the in-store kiosk device; and selecting the one or more appropriate experts from the plurality of appropriate experts, based at least in part on the bids.

12. The non-transitory computer-readable storage medium of claim 11, wherein the bids comprise a first bid price for providing sales assistance, and a second bid price for providing technical assistance.

13. The non-transitory computer-readable storage medium of claim 8, wherein the acts further comprise establishing a network connection to a remote source over a network for diagnostic analysis to occur at the remote source.

14. The non-transitory computer-readable storage medium of claim 13, wherein establishing the network connection further comprises authenticating the electronic device to determine that the electronic device is associated with the user.

15. A kiosk device comprising:

one or more processors;

one or more device receiving components coupled to the one or more processors, including at least one of a receptacle for an electronic device or a physical connector component for coupling to a corresponding component of the electronic device;

one or more wired interfaces, one or more wireless interfaces, or both, coupled to either or both of the one or more processors or the one or more device receiving components; and memory coupled to the one or more processors, the memory including one or more modules that are executable by the one or more processors to:

receive a request for assistance that is related to the electronic device;

establish a communicative connection with the electronic device through one of the one or more wired interfaces, one of the one or more wireless interfaces, or both;

access diagnostic information associated with the electronic device through the communicative connection;

perform a diagnostic analysis of the electronic device based at least in part on the diagnostic information to identify one or more appropriate experts;

determine that at least one of one or more appropriate experts is unavailable to receive a second communication;

transmit a call-waiting audio communication through the kiosk device;

determine that the at least one of the one or more appropriate experts is available to receive the second communication within a predetermined threshold period of time;

establish, through the kiosk device, the second communication between the one or more appropriate experts and a user; and provide an indication corresponding to one or more corrective options, based at least in part on the request for assistance and the diagnostic analysis.

16. The kiosk device of claim 15, wherein performing the diagnostic analysis further comprises:

establishing a communicative connection with a remote source over a network;

transmitting the diagnostic information to the remote source; and receiving further diagnostic analysis from the remote source.

17. The kiosk device of claim 15, wherein the one or more corrective options associated with the electronic device include installing a new application, removing an existing application, re-installing an existing application, configuring existing system preferences, or configuring user preferences associated with the electronic device.

18. The kiosk device of claim 15, wherein the one or more corrective options includes an option to facilitate an electronic device exchange.

* * * * *